(12) United States Patent
Liu et al.

(10) Patent No.: US 10,948,689 B2
(45) Date of Patent: Mar. 16, 2021

(54) LARGE-APERTURE, HIGH-PIXEL OPTICAL SYSTEM AND CAMERA MODULE USED THEREBY

(71) Applicant: GUANGDONG HONGJING OPTOELECTRONIC TECHNOLOGY INC., Guangdong (CN)

(72) Inventors: Honghai Liu, Guangdong (CN); Hongfei Wang, Guangdong (CN); Jiajun Liu, Guangdong (CN); Zhenting Liu, Guangdong (CN); Zhinong Fu, Guangdong (CN); Xiaoling Yin, Guangdong (CN); Bo Chen, Guangdong (CN); Aiping Xi, Guangdong (CN)

(73) Assignee: GUANGDONG HONGJING OPTOELECTRONIC TECHNOLOGY INC., Guangdong (CN)

( * ) Notice: Subject to any disclaimer, the term of this patent is extended or adjusted under 35 U.S.C. 154(b) by 115 days.

(21) Appl. No.: 16/340,668

(22) PCT Filed: Dec. 18, 2017

(86) PCT No.: PCT/CN2017/116811
§ 371 (c)(1),
(2) Date: Apr. 9, 2019

(87) PCT Pub. No.: WO2019/061866
PCT Pub. Date: Apr. 4, 2019

(65) Prior Publication Data
US 2019/0250368 A1    Aug. 15, 2019

(30) Foreign Application Priority Data

Sep. 28, 2017 (CN) .......................... 201721259353.9

(51) Int. Cl.
*G02B 9/62* (2006.01)
*G02B 9/60* (2006.01)
*G02B 13/00* (2006.01)

(52) U.S. Cl.
CPC ................. *G02B 9/60* (2013.01); *G02B 9/62* (2013.01); *G02B 13/00* (2013.01)

(58) Field of Classification Search
None
See application file for complete search history.

(56) References Cited

U.S. PATENT DOCUMENTS

| 7,907,352 B2 * | 3/2011 | Miyano ................ G02B 23/243 359/754 |
| 2014/0233114 A1 * | 8/2014 | Harada .............. A61B 1/00188 359/781 |

FOREIGN PATENT DOCUMENTS

| CN | 204143044 U | 2/2015 |
| CN | 204229036 U | 3/2015 |

(Continued)

*Primary Examiner* — Darryl J Collins
(74) *Attorney, Agent, or Firm* — Muncy, Geissler, Olds & Lowe, P.C.

(57) ABSTRACT

A large-aperture, high-pixel optical system has six lenses arranged successively from its object side to its image side along its optic axis. The first lens has a convex surface facing the object side and a concave surface facing the image side; The third lens is biconcave; the second and fifth lenses are biconvex; the fourth and sixth lenses each have a concave surface facing the object side and a convex surface facing the image side. The fifth lens and the sixth lens form a combined lens and the optical system satisfies TTL/EFL≤4.5. Also disclosed is a camera module using the system. The system and the module are mainly composed of six lenses. Since the number of lenses used is limited, the structure is simple.

16 Claims, 3 Drawing Sheets

(56) References Cited

FOREIGN PATENT DOCUMENTS

| CN | 107065140 A | 8/2017 |
|---|---|---|
| CN | 107505691 A | 12/2017 |
| CN | 107608056 A | 1/2018 |

* cited by examiner

LARGE-APERTURE, HIGH-PIXEL OPTICAL SYSTEM AND CAMERA MODULE USED THEREBY

BACKGROUND OF THE INVENTION

1. Technical Field

The present invention relates to optical systems and related camera modules, and more particularly to a large-aperture, high-pixel optical system for vehicle lens assemblies and a camera module using the optical system.

2. Description of Related Art

With the trend of having automotive driver assistance systems and safety systems in cars, vehicle lens assemblies have been used extensively. Since a lens assembly used in vehicle electronic rear-view mirrors must ensure clear imaging in both daytime and nighttime, one with a large aperture is desired. In addition, to provide detailed ambient images, a lens assembly needs the highest possible definition. To address the problems raised from numerous lenses and complicated structures as seen in the prior art, the present invention provides a large-aperture, high-pixel optical system.

SUMMARY OF THE INVENTION

To address the problems raised from numerous lenses and complicated structures as seen in the prior art, the present invention provides a large-aperture, high-pixel optical system.

The large-aperture, high-pixel optical system has a first lens, a second lens, a third lens, a fourth lens, a fifth lens, and a sixth lens arranged successively from its object side to its image side along its optic axis.

The first lens has a convex surface facing the object side and a concave surface facing the image side, and has a negative focal power.

The second lens has a convex surface facing the object side and a convex surface facing the image side, and has a positive focal power.

The third lens has a concave surface facing the object side and a concave surface facing the image side, and has a negative focal power.

The fourth lens has a concave surface facing the object side and a convex surface facing the image side, and has a positive focal power.

The fifth lens has a convex surface facing the object side and a convex surface facing the image side, and has a positive focal power.

The sixth lens has a concave surface facing the object side and a convex surface facing the image side, and has a negative focal power.

Therein, the fifth lens and the sixth lens are laminated into a combined lens, and the system satisfies TTL/EFL≤4.5, where TTL is a distance between an apex of the object side of the first lens and the image side of a focal plane, and EFL is an effective focal length of the optical system.

The present invention further provides a camera module.

The camera module at least comprises an optical lens assembly, which contains therein the foregoing large-aperture, high-pixel optical system.

The present invention is mainly composed of six lenses. Since the number of lenses used is limited, the structure is simple. With the unique arrangement of the lenses and the combined lens made of the fifth and sixth lenses, the desired optical performance thanks to the large aperture, high pixel, low distortion and good elimination of thermal difference can be achieved, making the present invention perfect for vehicle lens assembly products.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

The following preferred embodiments when read with the accompanying drawings are made to clearly exhibit the above-mentioned and other technical contents, features and effects of the present invention. Through the exposition by means of the non-limiting embodiments, people would further understand the technical means and effects the present invention adopts to achieve the above-indicated objectives.

Figure 1:
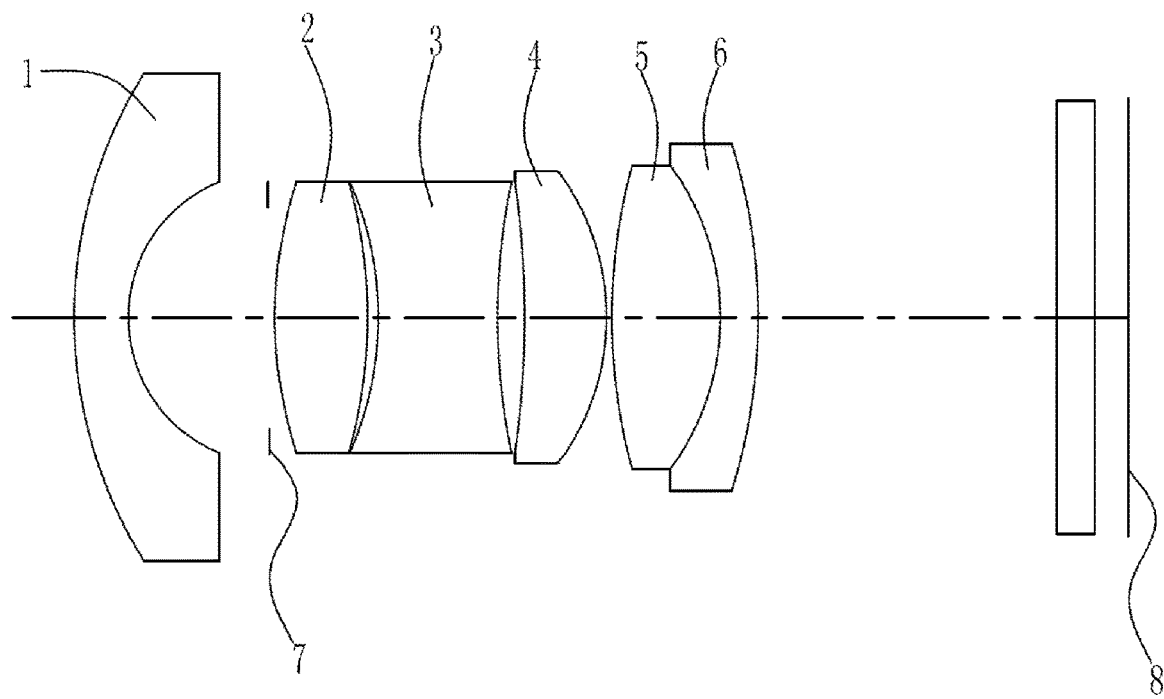
FIG. 1 schematically shows the structure of an optical system or a camera module according to the present invention.
Figure 2:
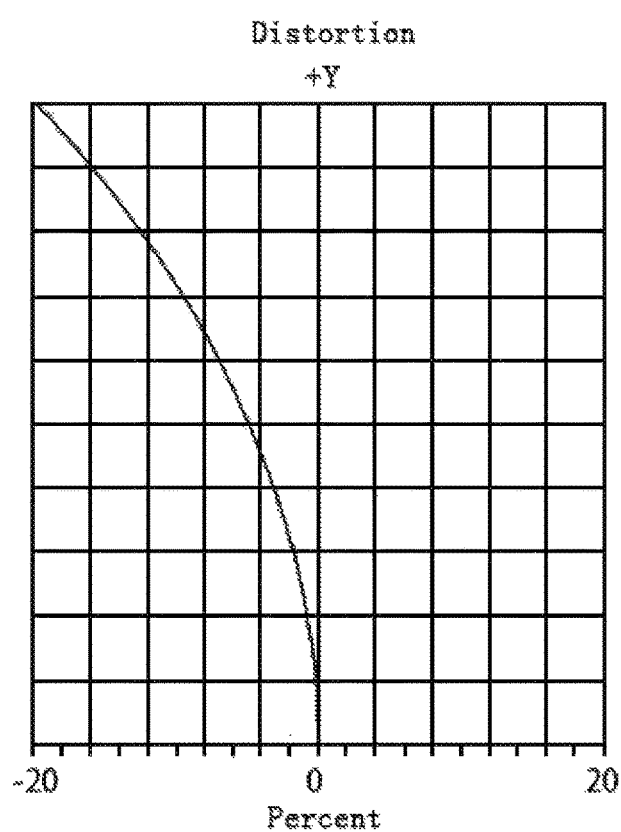
FIG. 2 is a distortion chart of the disclosed optical system or camera module at +25° C.
Figure 3:
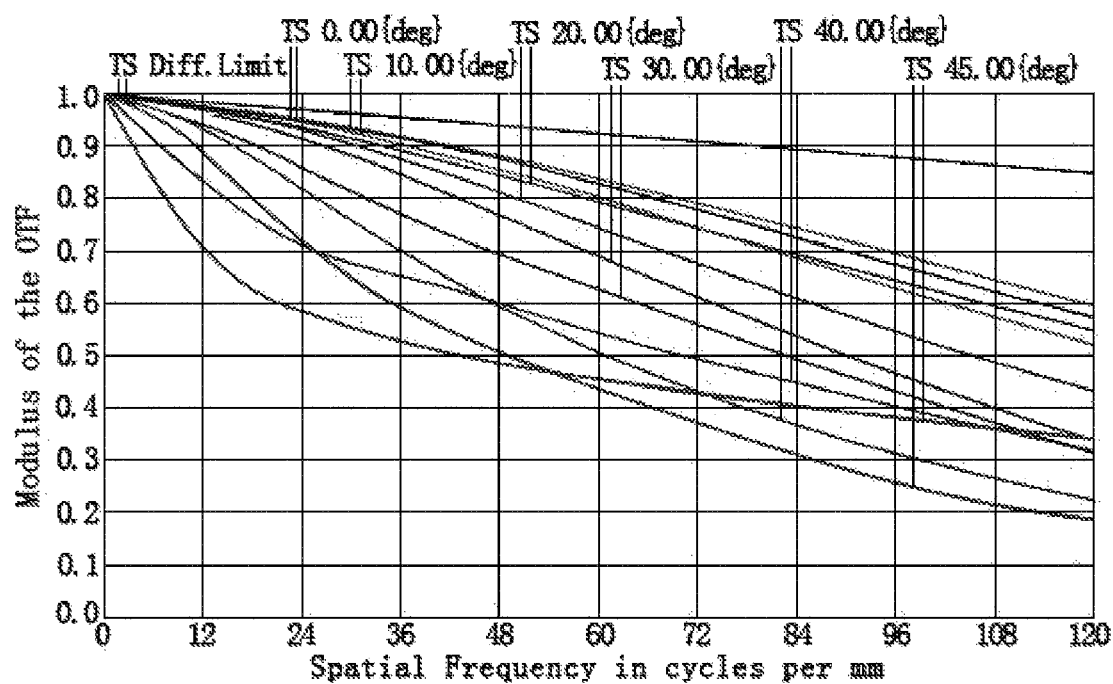
FIG. 3 is an MTF chart of the disclosed optical system or camera module at +25° C.
Figure 4:
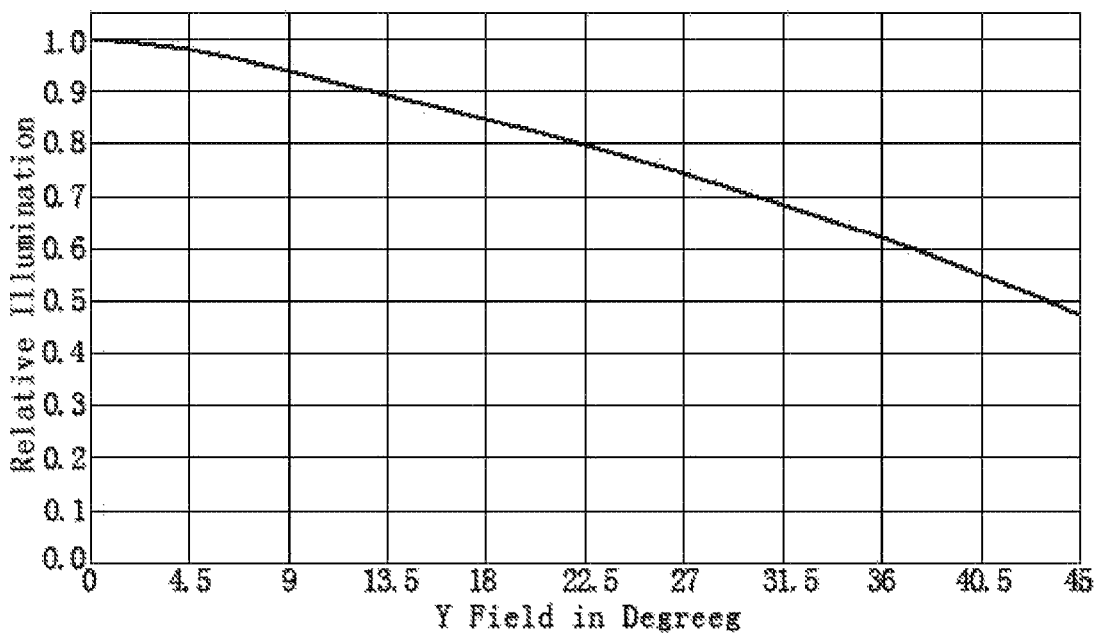
FIG. 4 is a relative illumination chart of the disclosed optical system or camera module at +25° C.
Figure 5:
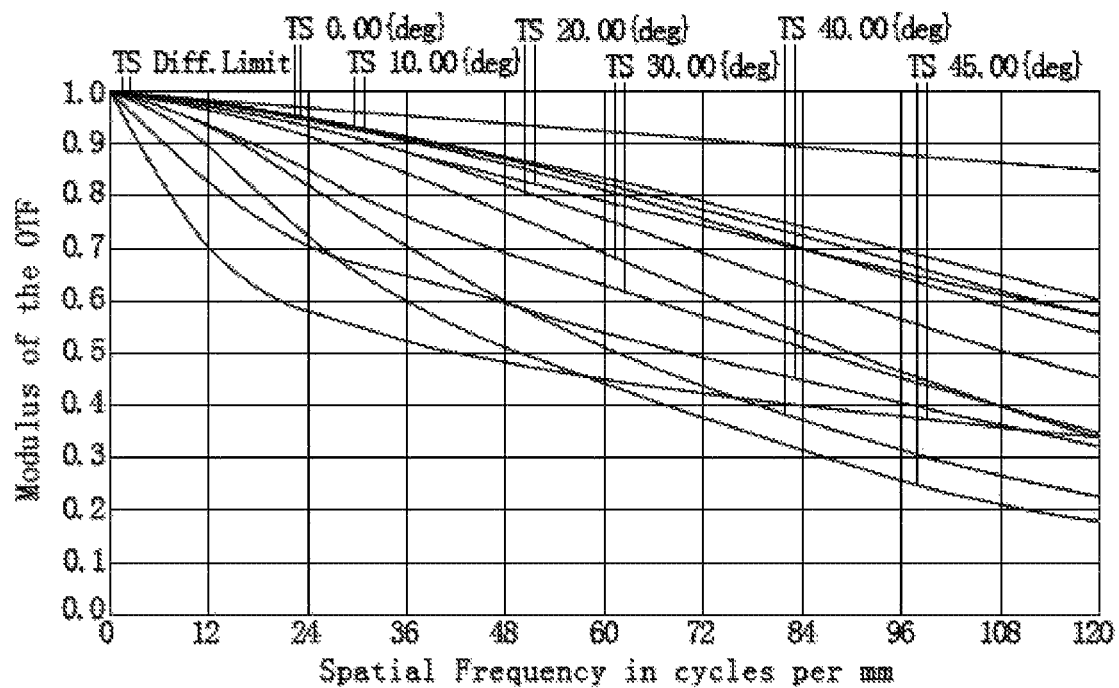
FIG. 5 is an MTF chart of the disclosed optical system or camera module at −40° C.
Figure 6:
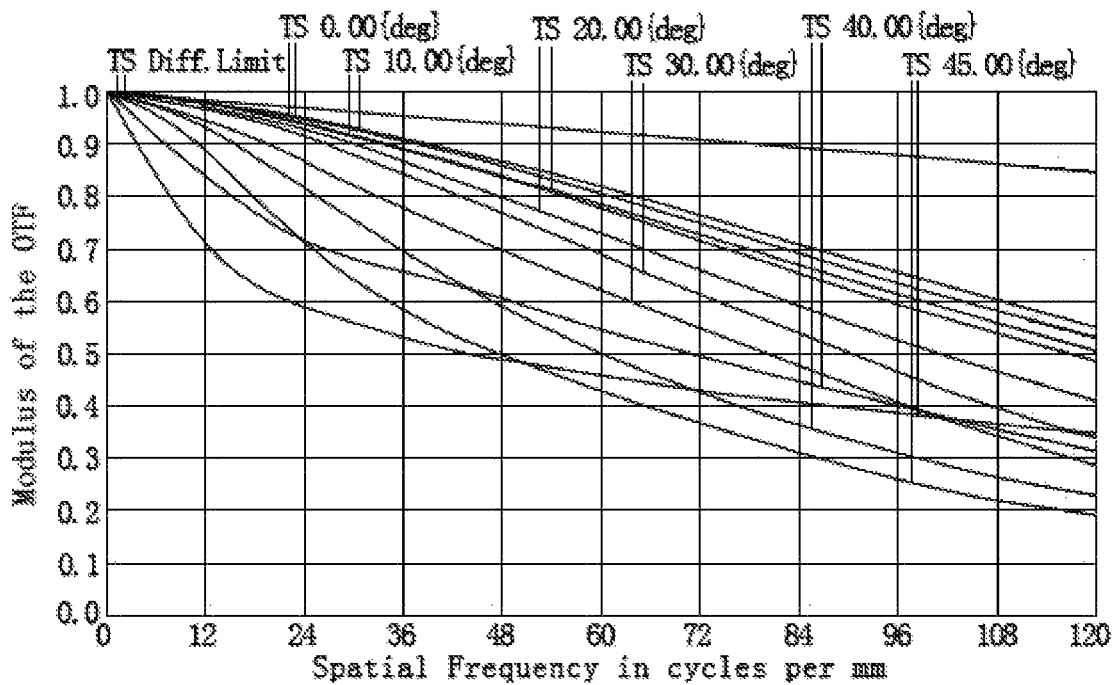
FIG. 6 is an MTF chart of the disclosed optical system or camera module at +85° C.

As shown in FIG. 1, a large-aperture, high-pixel optical system of the present invention has a first lens 1, a second lens 2, a third lens 3, a fourth lens 4, a fifth lens 5, and a sixth lens 6, which are arranged successively from its object side to its image side 8 along its optic axis.

The first lens 1 has a convex surface facing the object side and a concave surface facing the image side, and has a negative focal power.

The second lens 2 has a convex surface facing the object side and a convex surface facing the image side, and has a positive focal power.

The third lens 3 has a concave surface facing the object side and a concave surface facing the image side, and has a negative focal power.

The fourth lens 4 has a concave surface facing the object side and a convex surface facing the image side, and has a positive focal power.

The fifth lens 5 has a convex surface facing the object side and a convex surface facing the image side, and has a positive focal power.

The sixth lens 6 has a concave surface facing the object side and a convex surface facing the image side, and has a negative focal power;

Therein, the fifth lens 5 and the sixth lens 6 are laminated into a combined lens, and the system satisfies TTL/EFL≤4.5, where TTL is a distance between an apex of the object side of the first lens and the image side of a focal plane, and EFL the effective focal length of the optical system. Its value selection determines the focal length f of the entire optical system.

The disclosed system is mainly composed of six lenses. Since the number of lenses used is limited, the structure is simple. With the unique arrangement of the lenses and the combined lens made of the fifth and sixth lenses, the desired optical performance thanks to the large aperture, high pixel, low distortion and good elimination of thermal difference can be achieved, making the present invention perfect for vehicle lens assembly products.

Furthermore, the lenses of the optical system satisfy he following conditions:

$$10 < f1 < -2; \quad (1)$$

$$2 < f2 < 10; \quad (2)$$

$$10 < f3 < -2; \quad (3)$$

$$2 < f4 < 10; \quad (4)$$

$$2 < f5 < 10; \quad (5)$$

$$15 < f6 < -5; \text{ and} \quad (6)$$

$$5 < f56 < 20; \quad (7)$$

where, f1 represents a focal length of the first lens; f2 represents a focal length of the second lens 2; f3 represents a focal length of the third lens 3; f4 represents a focal length of the fourth lens 4; f5 represents a focal length of the fifth lens 5; f6 represents a focal length of the sixth lens 6; and f56 represents a combined focal length of the fifth lens 5 and the sixth lens 6. With the unique arrangement of the lenses, the desired optical performance thanks to the large aperture, high pixel, low distortion and good elimination of thermal difference can be achieved.

Furthermore, the lenses of the optical system satisfy the following conditions:

$$3.0 < f1/f < -0.8; \quad (1)$$

$$0.5 < f2/f < 1.5; \quad (2)$$

$$1.5 < f3/f < -0.5; \quad (3)$$

$$1.2 < f4/f < 2.0; \quad (4)$$

$$0.8 < f5/f < 1.7; \quad (5)$$

$$2.0 < |f6|/f < 3.2; \text{ and} \quad (6)$$

$$3.0 < f56/f < -1.0; \quad (7)$$

where, f represents a focal length of the entire optical system; f1 represents a focal length of the first lens, f2 represents a focal length of the second lens 2, f3 represents a focal length of the third lens 3, f4 represents a focal length of the fourth lens 4, f5 represents a focal length of the fifth lens 5, f6 represents a focal length of the sixth lens 6, and f56 represents a combined focal length of the fifth lens 5 and the sixth lens 6. With the unique arrangement of the lenses, the desired optical performance thanks to the large aperture, high pixel, low distortion and good elimination of thermal difference can be achieved.

Furthermore, first lens 1 has a material's refractive index Nd1 and a material Abbe constant Vd1, in which $1.75 < Nd1 < 1.95$, $25 < Vd1 < 50$. The structure is simple and ensures good optical performance.

Furthermore, second lens 2 has a material's refractive index Nd2 and a material Abbe constant Vd2, in which $1.80 < Nd2 < 2.10$, $20 < Vd2 < 35$. The structure is simple and ensures good optical performance.

Furthermore, third lens 3 has a material's refractive index Nd3 and a material Abbe constant Vd3, in which $1.75 < Nd3 < 1.95$, $17 < Vd3 < 40$. The structure is simple and ensures good optical performance.

Furthermore, fourth lens 4 has a material's refractive index Nd4 and a material Abbe constant Vd4, in which $1.75 < Nd4 < 1.95$, $35 < Vd4 < 55$. The structure is simple and ensures good optical performance.

Furthermore, fifth lens 5 has a material's refractive index Nd5 and a material Abbe constant Vd5, in which $1.55 < Nd5 < 1.75$, $45 < Vd5 < 70$. The structure is simple and ensures good optical performance.

Furthermore, sixth lens 6 has a material's refractive index Nd6 and a material Abbe constant Vd6, in which $1.75 < Nd6 < 1.98$, $15 < Vd6 < 40$. The structure is simple and ensures good optical performance.

Furthermore, an aperture stop 7 of the optical system is located between the first lens 1 and the second lens 2, and is close to the second lens 2. The structure is simple and effective in adjusting the intensity of the light beam.

Particularly, in the present embodiment, the optical system has a focal length f of 4.5 mm, a stop index FNo. of 1.7, and an angular field of view 2ω=90°, making it suitable for 1/2.7" high-definition sensor. The optical system is defined by the following basic parameters:

| Surface | Radius of Curvature R(mm) | Thickness D(mm) | Refractive Index Nd | Dispersion Value Vd |
|---|---|---|---|---|
| S1 | 8.50 | 1.00 | 1.91 | 35.25 |
| S2 | 2.70 | 2.70 | | |
| S3 | Infinite | 0.00 | | |
| S4 | 8.20 | 1.70 | 1.94 | 17.94 |
| S5 | −9.20 | 0.20 | | |
| S6 | −6.20 | 2.20 | 1.80 | 25.47 |
| S7 | 12.20 | 0.50 | | |
| S8 | −17.50 | 1.50 | 1.83 | 42.72 |
| S9 | −4.50 | 0.10 | | |
| S10 | 10.70 | 2.00 | 1.56 | 56.05 |
| S11 | −4.70 | 0.70 | 1.92 | 20.88 |
| S12 | −10.70 | 5.50 | | |
| S13 | Infinite | 0.70 | 1.51 | 64.21 |
| S14 | Infinite | 1.00 | | |
| S15 | Infinite | — | | |

In the above table, along the optic axis, form the object side to the image side, S1 and S2 describe the two surfaces of the first lens 1; S3 corresponds to the location of the aperture stop STO of the optical system; S4 and S5 describe the two surfaces of the second lens 2; S6 and S7 describe the two surfaces of the third lens 3; S8 and S9 describe the two surfaces of the fourth lens 4; S10 and S11 describe the two surfaces of the fifth lens 5; S11 and S12 describe the two surfaces of the sixth lens 6; S13 and S14 describe the two surfaces of a cover glass between the sixth lens 6 and the image side 8; and S15 is the image side 8 of the sensor.

As proven in FIG. 2 through FIG. 6, the disclosed optical system is good at elimination of thermal difference. With the unique arrangement of the lenses and reasonable allocation of focal powers, the desired optical performance thanks to the large aperture, high pixel, low distortion and good elimination of thermal difference can be achieved.

The present invention further provides a camera module that at least comprises an optical lens assembly, which contains therein the foregoing large-aperture, high-pixel optical system.

The camera module mainly composed of six lenses. Since the number of lenses used is limited, the structure is simple. With the unique arrangement of the lenses and the combined lens made of the fifth and sixth lenses, the desired optical performance thanks to the large aperture, high pixel, low distortion and good elimination of thermal difference can be achieved, making the present invention perfect for vehicle lens assembly products.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A large-aperture, high-pixel optical system comprising a first lens, a second lens, a third lens, a fourth lens, a fifth lens, and a sixth lens, which arranged successively from its object side to its image side along its optic axis, wherein the first lens has a convex surface facing the object side and a concave surface facing the image side, and has a negative focal power;

the second lens has a convex surface facing the object side and a convex surface facing the image side, and has a positive focal power;

the third lens has a concave surface facing the object side and a concave surface facing the image side, and has a negative focal power;

the fourth lens has a concave surface facing the object side and a convex surface facing the image side, and has a positive focal power;

the fifth lens has a convex surface facing the object side and a convex surface facing the image side, and has a positive focal power; and the sixth lens has a concave surface facing the object side and a convex surface facing the image side, and has a negative focal power;

in which the fifth lens and the sixth lens are laminated into a combined lens and the optical system satisfies TTL/EFL≤4.5, where TTL is a distance between an apex of the object side of the first lens and the image side of a focal plane, and EFL is an effective focal length of the optical system;

wherein the lenses satisfy the following conditions:

$-10<f1<-2;$ (1)

$2<f2<10;$ (2)

$-10<f3<-2;$ (3)

$2<f4<10;$ (4)

$2<f5<10;$ (5)

$-15<f6<-5;$ and (6)

$5<f56<20;$ (7)

where, f1 represents a focal length of the first lens; f2 represents a focal length of the second lens; f3 represents a focal length of the third lens; f4 represents a focal length of the fourth lens; f5 represents a focal length of the fifth lens; f6 represents a focal length of the sixth lens; and f56 represents a combined focal length of the fifth lens and the sixth lens.

2. The large-aperture, high-pixel optical system of claim 1, wherein the first lens has a material's refractive index Nd1 and a material Abbe constant Vd1, in which 1.75<Nd1<1.95, 25<Vd1<50.

3. The large-aperture, high-pixel optical system of claim 1, wherein the second lens has a material's refractive index Nd2 and a material's Abbe number Vd2, in which 1.80<Nd2<2.10, 20<Vd2<35.

4. The large-aperture, high-pixel optical system of claim 1, wherein the third lens has a material's refractive index Nd3 and a material's Abbe number Vd3, in which 1.75<Nd3<1.95, 17<Vd3<40.

5. The large-aperture, high-pixel optical system of claim 1, wherein the fourth lens has a material's refractive index Nd4 and a material's Abbe number Vd4, in which 1.75<Nd4<1.95, 35<Vd4<55.

6. The large-aperture, high-pixel optical system of claim 1, wherein the fifth lens has a material's refractive index Nd5 and a material's Abbe number Vd5, in which 1.55<Nd5<1.75, 45<Vd5<70.

7. The large-aperture, high-pixel optical system of claim 1, wherein the sixth lens has a material's refractive index Nd6 and a material's Abbe number Vd6, in which 1.75<Nd6<1.98, 15<Vd6<40.

8. A camera module, at least comprising an optical lens assembly, wherein the optical lens assembly contains therein the large-aperture, high-pixel optical system of claim 1.

9. A large-aperture, high-pixel optical system comprising a first lens, a second lens, a third lens, a fourth lens, a fifth lens, and a sixth lens, which arranged successively from its object side to its image side along its optic axis, wherein the first lens has a convex surface facing the object side and a concave surface facing the image side, and has a negative focal power;

the second lens has a convex surface facing the object side and a convex surface facing the image side, and has a positive focal power;

the third lens has a concave surface facing the object side and a concave surface facing the image side, and has a negative focal power;

the fourth lens has a concave surface facing the object side and a convex surface facing the image side, and has a positive focal power;

the fifth lens has a convex surface facing the object side and a convex surface facing the image side, and has a positive focal power; and the sixth lens has a concave surface facing the object side and a convex surface facing the image side, and has a negative focal power;

in which the fifth lens and the sixth lens are laminated into a combined lens and the optical system satisfies TTL/EFL≤4.5, where TTL is a distance between an apex of the object side of the first lens and the image side of a focal plane, and EFL is an effective focal length of the optical system;

wherein the lenses satisfy the following conditions:

$-3.0<f1/f<-0.8;$ (1)

$0.5<f2/f<1.5;$ (2)

$-1.5<f3/f<-0.5;$ (3)

$1.2<f4/f<2.0;$ (4)

$0.8<f5/f<1.7;$ (5)

$2.0<|f6|/f<3.2;$ and (6)

$-3.0<f56/f<-1.0;$ (7)

where, f represents a focal length of the entire optical system; f1 represents a focal length of the first lens; f2 represents a focal length of the second lens; f3 represents a focal length of the third lens; f4 represents a focal length of the fourth lens; f5 represents a focal length of the fifth lens; f6 represents a focal length of the sixth lens; and f56 represents a combined focal length of the fifth lens and the sixth lens.

10. The large-aperture, high-pixel optical system of claim 9, wherein the first lens has a material's refractive index Nd1 and a material Abbe constant Vd1, in which $1.75 < Nd1 < 1.95$, $25 < Vd1 < 50$.

11. The large-aperture, high-pixel optical system of claim 9, wherein the second lens has a material's refractive index Nd2 and a material's Abbe number Vd2, in which $1.80 < Nd2 < 2.10$, $20 < Vd2 < 35$.

12. The large-aperture, high-pixel optical system of claim 9, wherein the third lens has a material's refractive index Nd3 and a material's Abbe number Vd3, in which $1.75 < Nd3 < 1.95$, $17 < Vd3 < 40$.

13. The large-aperture, high-pixel optical system of claim 9, wherein the fourth lens has a material's refractive index Nd4 and a material's Abbe number Vd4, in which $1.75 < Nd4 < 1.95$, $35 < Vd4 < 55$.

14. The large-aperture, high-pixel optical system of claim 9, wherein the fifth lens has a material's refractive index Nd5 and a material's Abbe number Vd5, in which $1.55 < Nd5 < 1.75$, $45 < Vd5 < 70$.

15. The large-aperture, high-pixel optical system of claim 9, wherein the sixth lens has a material's refractive index Nd6 and a material's Abbe number Vd6, in which $1.75 < Nd6 < 1.98$, $15 < Vd6 < 40$.

16. A camera module, at least comprising an optical lens assembly, wherein the optical lens assembly contains therein the large-aperture, high-pixel optical system of claim 9.

* * * * *